United States Patent [19]

Snow

[11] 4,128,958

[45] Dec. 12, 1978

[54] WATER FOWL DECOY

[76] Inventor: Marvin Snow, P.O. Box 1014, Paradise, Calif. 95969

[21] Appl. No.: 804,679

[22] Filed: Jun. 8, 1977

[51] Int. Cl.² ........................................... A01M 31/06
[52] U.S. Cl. ......................................................... 43/3
[58] Field of Search ........................................ 43/2, 3

[56] References Cited

U.S. PATENT DOCUMENTS

| 378,410 | 2/1888 | Trimble | 43/3 |
|---------|--------|---------|------|
| 2,691,233 | 10/1954 | Richardson | 43/3 |
| 2,909,859 | 10/1959 | Christmas | 43/3 |

Primary Examiner—Jimmy C. Peters
Attorney, Agent, or Firm—Townsend and Townsend

[57] ABSTRACT

A decoy which can be made to resemble the external apparatus of a duck or a goose. The decoy is provided with a body capable of floating on the water surface. A pair of movable wings is hingedly mounted on the sides of the body, and control means in the form of flexible strings or lines is coupled with each wing at two locations thereon to cause movement of the wings from retracted positions extending along the body to operative positions extending laterally of the body and, when the wings are in operative positions, to cause the wings to move up and down in a flapping motion to simulate the wing action of a live bird floating on the water. Improved hinge means permits the wings to pivot relative to the body between the retracted and operative positions and to move up and down relative to the body when the wings are in the operative positions.

8 Claims, 6 Drawing Figures

U.S. Patent  Dec. 12, 1978  Sheet 1 of 2  4,128,958
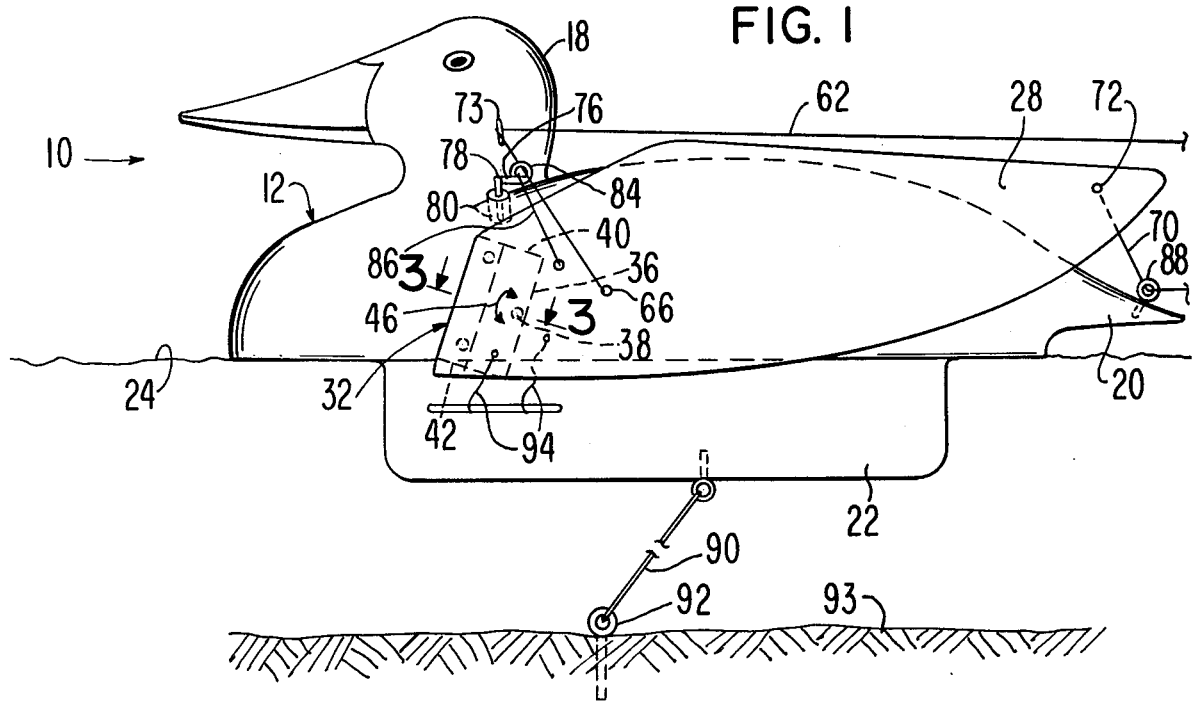
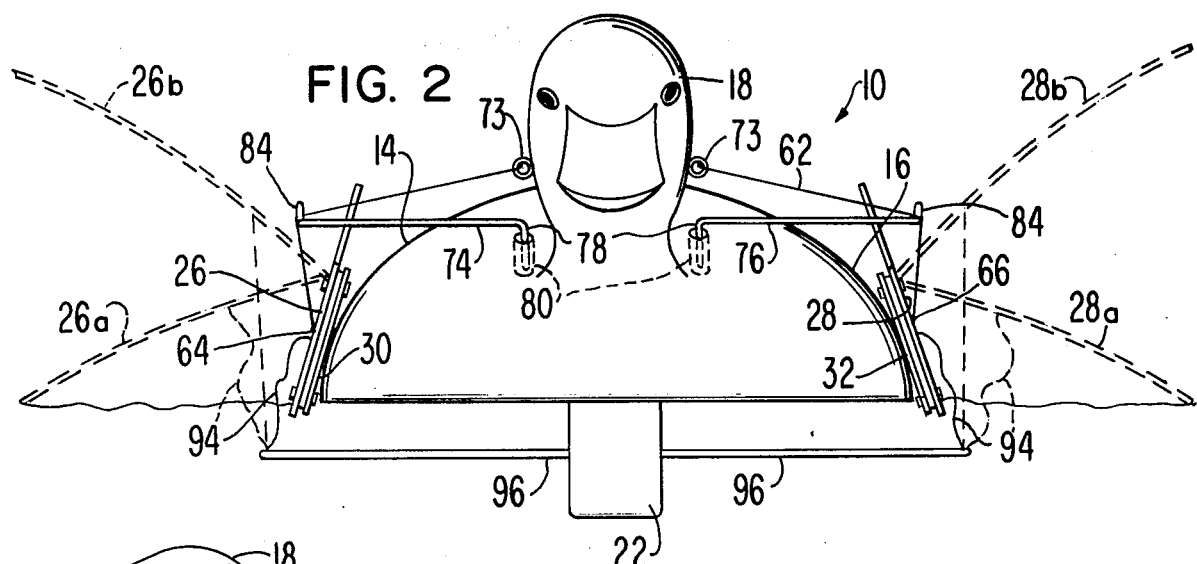
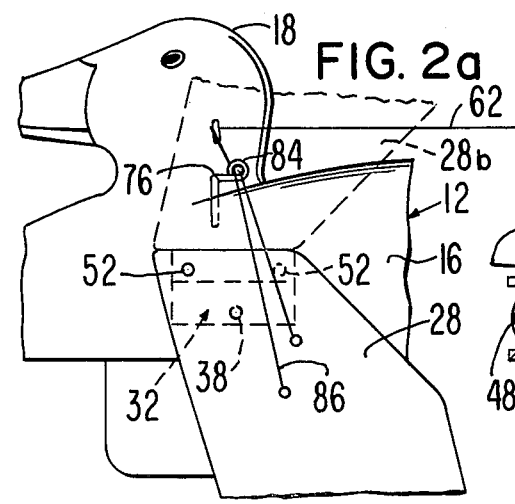
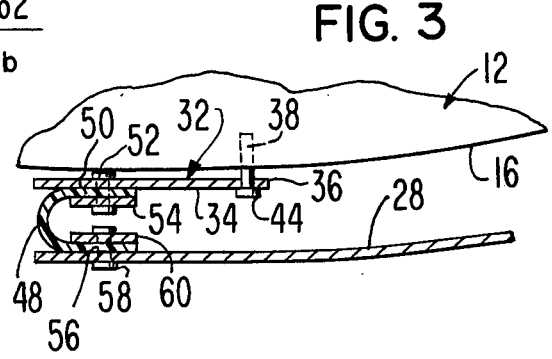

WATER FOWL DECOY

This invention relates to improvements in duck or goose decoys and, more particularly, to an improved decoy having movable wings remotely actuated to simulate the actions of a live bird floating on water.

BACKGROUND OF THE INVENTION

The usual duck or goose decoy is of one-piece construction suitable for floating on the surface of a body of water and having no moving parts. While decoys of this type may be satisfactory in some duck hunting situations, it has been found to be helpful to have one or more of the decoys of a group floating on a body of water provided with moving parts, such as wings, so that a live bird flying overhead more readily will be attracted to the group and will be enticed to join the group. This is considered to be true if one of the decoys shows a flapping of its wings occasionally or a retracting of its wings after a flapping motion.

Attempts in the past have been made to provide mechanized decoys with moving parts, such as moving wings or the like. For the most part, these are complex structures and are either too costly to produce and maintain or are extremely difficult to operate from a remote distance, such as by a user in a duck blind 20 and 30 feet away from the decoy. Moreover, most of these decoys have moving parts internally of the decoy body, thus requiring that forces for the moving parts be generated in a small space which gives rise to maintenance problems. Typical of these attempts are those disclosed in the following U.S. Pat. Nos. 2,691,233; 2,835,064; 3,000,128; 3,916,553; and 3,927,485. Other decoy patents, although not disclosing movable parts on a decoy body, are as follows: U.S. Pat. Nos. 2,726,469; and 3,689,927.

In view of the deficiencies of the prior art decoys of the type mentioned above, a need has arisen for an improved mechanized duck or goose decoy having external moving parts wherein the decoy is simple and rugged in construction, is easy to operate and maintain, and can be produced at minimum costs.

SUMMARY OF THE INVENTION

The present invention satisfies the aforesaid need by providing an improved duck or goose decoy which has movable wings mounted on the side of the decoy body and controlled by strings or other flexible members external to the body and manipulated from a remote location, such as a duck blind, when the decoy is anchored in place. Thus, the wings can be moved from retracted positions to operative positions and, when in the operative positions, the wings can be made to move up and down in a flapping motion to thereby simulate the wing action of a live bird floating in the water. This wing action will attract birds flying overhead and will serve to lure the flying birds to come within the shooting range of hunters stationed in duck blinds near the decoy. The control strings are of such small size that the movements of the strings cannot be seen easily by birds flying overhead; thus, the only movements visible to the flying birds are the mechanical movement of the wings operated by the control strings manipulated from the remote location.

The foregoing aim is achieved by the use of improved hinges for the wings which permit the wings to be readily moved from retracted positions extending fore and aft along the sides of the body to operative positions extending laterally from the body, then to be moved up and down when the wings are in their operative positions to simulate the wings flapping motions mentioned above. The wings are provided with limit devices, such as short, flexible lines, which limit the upward and downward movements of the wings when the same are in their operative positions. This assures maximum control of the wings at all times notwithstanding the relatively long lengths of the wings so as to better simulate the actual wings and wing motions of a live bird.

The primary object of the invention is to provide an improved water fowl decoy which has wings which are operated mechanically from a remote location and which do not require any internal mechanism in the decoy body itself with the control being completely external of the body and operated remotely from the decoy to simulate the wing action of a live bird floating on a body of water.

Another object of this invention is to provide a decoy of the type described which is provided with hinge means for the wings thereof to permit the wings to move from retracted positions extending along the sides of the body to operative positions extending laterally from the body by manipulation of manual control means so that, in their operative positions, the wings can be caused to move up and down by continued manipulation of the control means to simulate a wing flapping action to attract birds flying overhead.

Still another object of this invention is to provide a decoy of the aforesaid character which is provided with flexible strings or lines extending away from the bird and coupled with the wings so that, when the decoy is anchored in place, the strings can be manipulated from a remote location to cause the wings to move up and down and to be retracted, all without exposing the movements of the strings themselves or the movements of the operators of the strings.

Other objects of this invention will become apparent as the following specification progresses, reference being had to the accompanying drawing for an illustration of the invention.

In the drawing:

FIG. 1 is a side elevational view of the decoy of this invention, showing the wings in retracted positions extending along the sides of the decoy;

FIG. 2 is a front elevational view of the decoy of FIG. 1;

FIG. 2a is a fragmentary, side elevational view of the decoy showing one wing in an operative position extending laterally from the corresponding side of the decoy body;

FIG. 3 is an enlarged, fragmentary, cross-sectional view taken along line 3—3 of FIG. 1;

Figure 4:
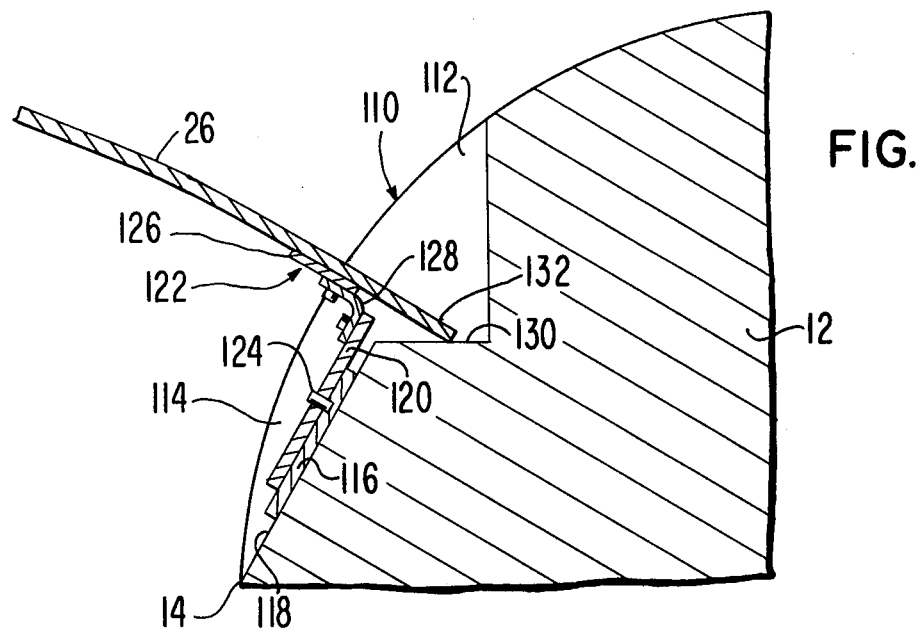
FIG. 4 is an enlarged, fragmentary, cross-sectional view of a second embodiment of the decoy.

The duck decoy of this invention is broadly denoted by the numeral 10 and includes a body 12 having a pair of opposed sides 14 and 16 (FIG. 2), a head 18 and a tail 20 (FIG. 1). The decoy has a bottom fin 22 or other suitable structure which provides stability for the decoy when the same floats on the surface 24 of a body of water.

Decoy 10 has a pair of wings 26 and 28 which are substantially the same in construction, size and shape. Each wing is formed from a suitable material, such as sheet metal or thin plastic sheet. Preferably, the wings will be of a color which matches or blends with the color of the body and head of decoy 10. The wings are pivotally and hingedly connected to body 12 at respective sides 14 and 16 by corresponding hinges 30 and 32, the hinges being substantially identical in construction.

Each hinge includes a first hinge plate 34 (FIG. 3) which is pivotally mounted along one edge 36 (FIG. 1) thereof by a pin 38 which extends into body 12 and is fixed relative thereto, such as by being molded to it. The pin is intermediate the end edges 40 and 42 (FIG. 1) of the corresponding hinge plate. Pin 38 has a head 44 on the outer end thereof to retain plate 34 thereon. Hinge plate 34 can rotate in a clockwise sense and in a counterclockwise sense about pin 38 when viewing FIG. 1 as indicated by arrow 46.

A U-shaped, flexible hinge member 48, such as a thin plastic sheet, is secured at one side margin 50 thereof to plate 34 as shown in FIG. 3. For purposes of illustration, member 48 is secured by a pair of spaced rivets 52 which extend through plate 34 and through a rigid metallic or other strip 54 which clamps end margin 50 to hinge plate 34. Similarly, the opposite margin 56 of member 48 is secured by rivets 58 which pass through the corresponding wing and through a rigid strip 60. Thus, the corresponding wing can rotate about the axis of pin 38 and can pivot about an axis through member 48.

Means for controlling the movements of both wings simultaneously includes a first flexible string 62 coupled at the ends thereof to locations 64 and 66 on wings 26 and 28, respectively, and a second string 70 coupled at the ends thereof at two locations near the outer ends of the strings, such as location 72 of wing 28 as shown in FIG. 1.

String 62, is guided by a pair of eyelets 73 secured to opposite sides of head 18 and by eyelets 84 on the outer ends of a pair of rigid wires 74 and 76 extending laterally from locations near the neck of the decoy and terminating above respective hinges. Each of wires 74 and 76 has a generally vertical extension 78 received within a tube 80 embedded in body 12 and provided with an outer flange 82. Wires 74 and 76 are permitted to pivot through limited arcs in a horizontal plane when the wings are moved into operative and retracted positions to be described. Also, a flexible line, such as string 86, extends from each eyelet 84 to a location on the wing near the location through which the end of the string is connected as shown in FIG. 1. Line 86 assures that the wing does not droop below a certain limit when the wing is pivoted as hereinafter described by the manipulation of strings 62 and 70.

String 70 passes through an eyelet 88 secured to tail 20 as shown in FIG. 1. Both strings 62 and 70 extend rearwardly from the decoy and are manipulated at a remote location, such as 10 to 30 feet away from the decoy, by an operator standing or sitting, for instance, in a duck blind. To prevent movement of the decoy as strings 62 and 70 are pulled, the decoy is anchored in any suitable manner, such as by a line 90 secured to an anchor 92 in the bottom 93 of the body of water.

A pair of U-shaped holes 96 project laterally from opposed sides of stabilizing fin 22. The outer ends of each hole provided a tie-down point for a pair of flexible lines 94, such as strings, which limit the upward movement of wings 26 and 28 when they are being moved up and down by the pulling of strings 62 and 70.

In operation, assuming that the decoy is in the water and is anchored by line 90 and anchor 92, lines 62 and 70 extend away from the decoy and will be manipulated from a duck blind for instance, possibly 20 to 30 feet away from the decoy. When pulling on string 70, the tips of the wings can be made to approach eyelet 88, thereby causing the wings to extend along the sides of the body of the decoy. The wings can be maintained in these retracted positions until it is desired to cause movement of the wings, such as when a group of ducks is flying above the water and their attention is to be attracted to decoy 10 and other decoys arounds it.

When this occurs, the user relaxes the pulling force on string 70 and commences to pull on string 62, causing the wings to be first pulled into the dashed line operative positions denoted by 26a and 28a of FIG. 2. This initial movement will cause the hinges coupling the wings to the decoy body to rotate in a clockwise sense when viewing FIG. 1 until the hinges are in locations as shown in FIG. 2a. Restraining lines 86 prevent complete collapse or droop of the wings when they are in positions 26a and 28a. Alternate pulling and relaxing the force on string 62 causes the wings to move up and down from locations 26a and 28a to locations 26b and 28b (FIG. 2) and return. Lines 94 prevent upward movement of the wings beyond a certain limit determined by the lengths of lines 94.

When the pulling force on string 62 is reduced, the wings fall under their own weight from positions 26b and 28b back toward positions 26a and 28a. The wings can continue to be moved up and down by continued pulling and releasing of string 62, thereby simulating the flapping of the wings of a live duck.

When the wings are to be retracted again, the force on string 62 is relaxed, allowing the wings to fall into positons 26a and 28a. Then, string 70 is pulled, causing the hinges to rotate in a counterclockwise direction (viewing FIG. 1) about respective pins 38, thereby permitting the tips of the wings to be pulled inwardly toward the body and to approach the tail 20 of the decoy. The wings will then be in the retracted positions of FIG. 1.

Figure 5:
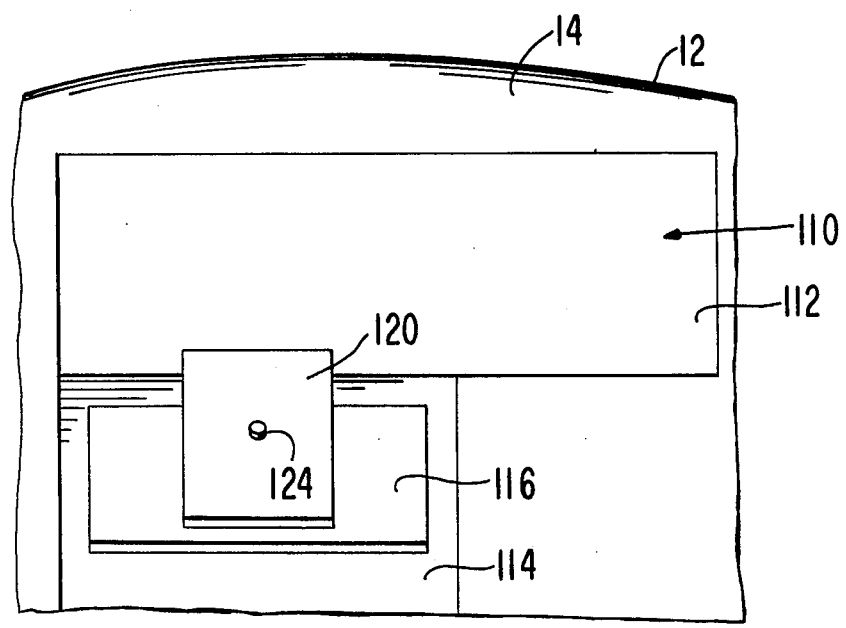
FIG. 5 is a fragmentary, side elevational view of the decoy of FIG. 4.

In another embodiment of the invention as shown in FIGS. 4 and 5, body 12 has, at each of sides 14 and 16, a recess generally denoted as numeral 110 and having an upper part 112 and a lower part 114. A hinge mounting plate 116 is secured to surface 118 in recess part 114 in any suitable manner. A first hinge plate 120 of a hinge 122 is pivotally mounted by a pin 124 to hinge plate 120. A second hinge plate 126 carried by each of wings 26 and 28 is hingedly secured by a flexible coupling 138 to hinge plate 120. Hinge mounting plate 116 and hinge plate 120 are disposed within recess part 114 and cannot be seen when viewing the decoy from the front.

Recess part 112 has a generally horizontal surface 130 which the inner end 132 of each wing engages when the wings are fully elevated as shown in FIG. 4. Thus, surface 130 serves as a stop to limit the upward travel of the wings when the latter are extended and are in a flapping mode. Also, the wings, when end 132 engages surface 130, cannot move forwardly or rearwardly.

I claim:

1. A water fowl decoy comprising: a body having a pair of opposed sides and being formed of a material capable of floating on the surface of the water; a pair of wings, there being a wing for each side of the body, respectively; a hinge for each wing, respectively, each hinge being pivotally mounted on the body to permit the corresponding wing to move from a retracted position extending along a respective side of the body to an operative position extending outwardly from the body, each hinge further having means permitting the corresponding wing to move up and down when the wing is in the operative position; a first flexible control member coupled to the wings at locations adjacent to the hinges thereof; and a second flexible control member coupled to the wings near the outer ends thereof, said members extending away from the body to a location remote therefrom for controlling the movements of the wings relative to the body.

2. A decoy as set forth in claim 1, wherein the body is provided with a pair of rigid elements extending laterally from the opposed sides thereof, each element having an eyelet at the outer end thereof, there being a second eyelet for each element, respectively, each second element being on the body near the connection of the respective element thereto, the first control member extending through the first and second eyelets and being connected at each end thereof to the wing adjacent thereto, the control member extending rearwardly of the body.

3. A decoy as set forth in claim 1, wherein the rear end of the body is provided with an eyelet, said second control member extending through the eyelet and laterally therefrom to the tips of the wings, the second control member extending rearwardly from said rear end.

4. A decoy as set forth in claim 1, wherein is provided means coupled with the decoy for anchoring the same in the bottom of a body of water.

5. A decoy as set forth in claim 1, wherein each hinge is provided with a pair of hinge plates, and means pivotally coupling the plates to each other, one of the plates being pivotally mounted on the body for rotation about an axis extending transversely of the corresponding side, the other plate being coupled to the corresponding wing.

6. A decoy as set forth in claim 5, wherein the body is provided with a pin for each side, respectively, the pin extending into the side and extending into the corresponding part of the adjacent hinge for pivotally mounting the same on the body.

7. A decoy as set forth in claim 1, wherein is provided means for limiting the upward and downward travel of the wings when the same are in the operative positions thereof.

8. A decoy as set forth in claim 7, wherein said body has a recess in each of the opposed sides thereof, each recess having a generally horizontal surface, said surface defining the limiting means for each wing, respectively.

* * * * *